United States Patent [19]

Watton

[11] 4,142,691
[45] Mar. 6, 1979

[54] SOD ROLLING APPARATUS

[76] Inventor: John R. Watton, 20 Headswell Crescent, Redhill, Bournemouth, England

[21] Appl. No.: 903,773

[22] Filed: May 5, 1978

[30] Foreign Application Priority Data

May 10, 1977 [GB] United Kingdom ............... 19482/77

[51] Int. Cl.² ...................... B65H 75/02; A01B 45/04
[52] U.S. Cl. ........................................ 242/55; 172/19; 242/67.1 R; 242/DIG. 3
[58] Field of Search .............. 242/55, 67.1 R, DIG. 3; 172/19

[56] References Cited

U.S. PATENT DOCUMENTS

| 3,235,011 | 2/1966 | Pasinski | 172/19 |
| 3,375,877 | 4/1968 | Pasinski | 172/19 |
| 3,464,641 | 9/1969 | Brouwer | 242/55 |
| 3,790,096 | 2/1974 | Brouwer | 242/55 |

Primary Examiner—Edward J. McCarthy
Attorney, Agent, or Firm—Lowe, King, Price & Becker

[57] ABSTRACT

Apparatus for starting a turn in a strip of sod travelling along a conveyor and for causing the sod to roll up once an end of the strip has been turned, which apparatus is effective on sods of any condition, comprises deflecting means having a scoop to receive the leading end of a sod up to a stop plate adjustable in the scoop, contact of the sod with the stop plate causing the scoop to pivot and turn up the leading end of the sod, the deflecting means being mounted above the conveyor so as to be able to be lifted by the turned up sod, whereafter the conveyor carries the sod beneath the deflecting means, which also has cross-bars on its underside to cause rolling up of the sod once the end has been turned up.

11 Claims, 9 Drawing Figures

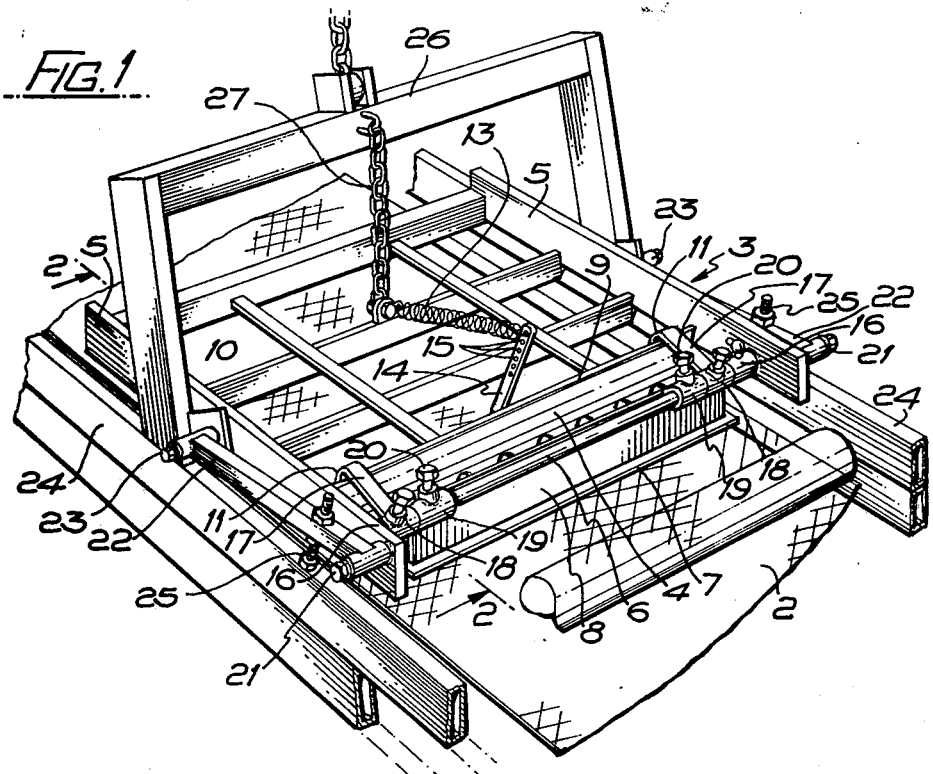
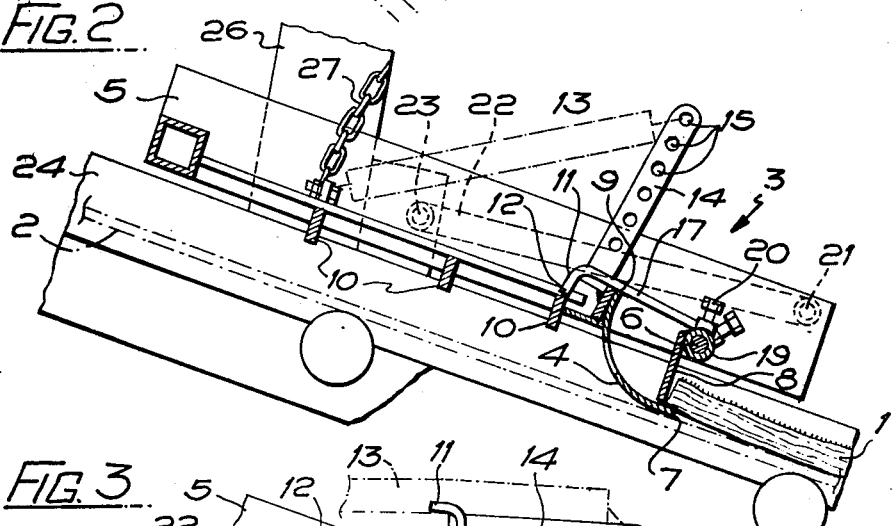
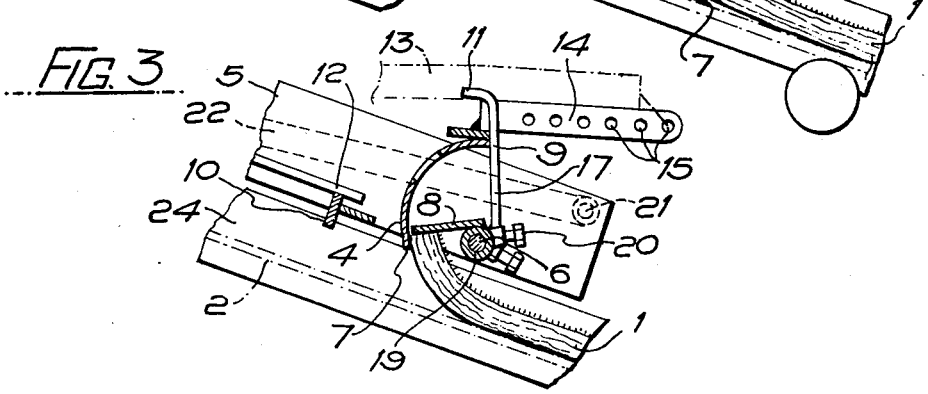

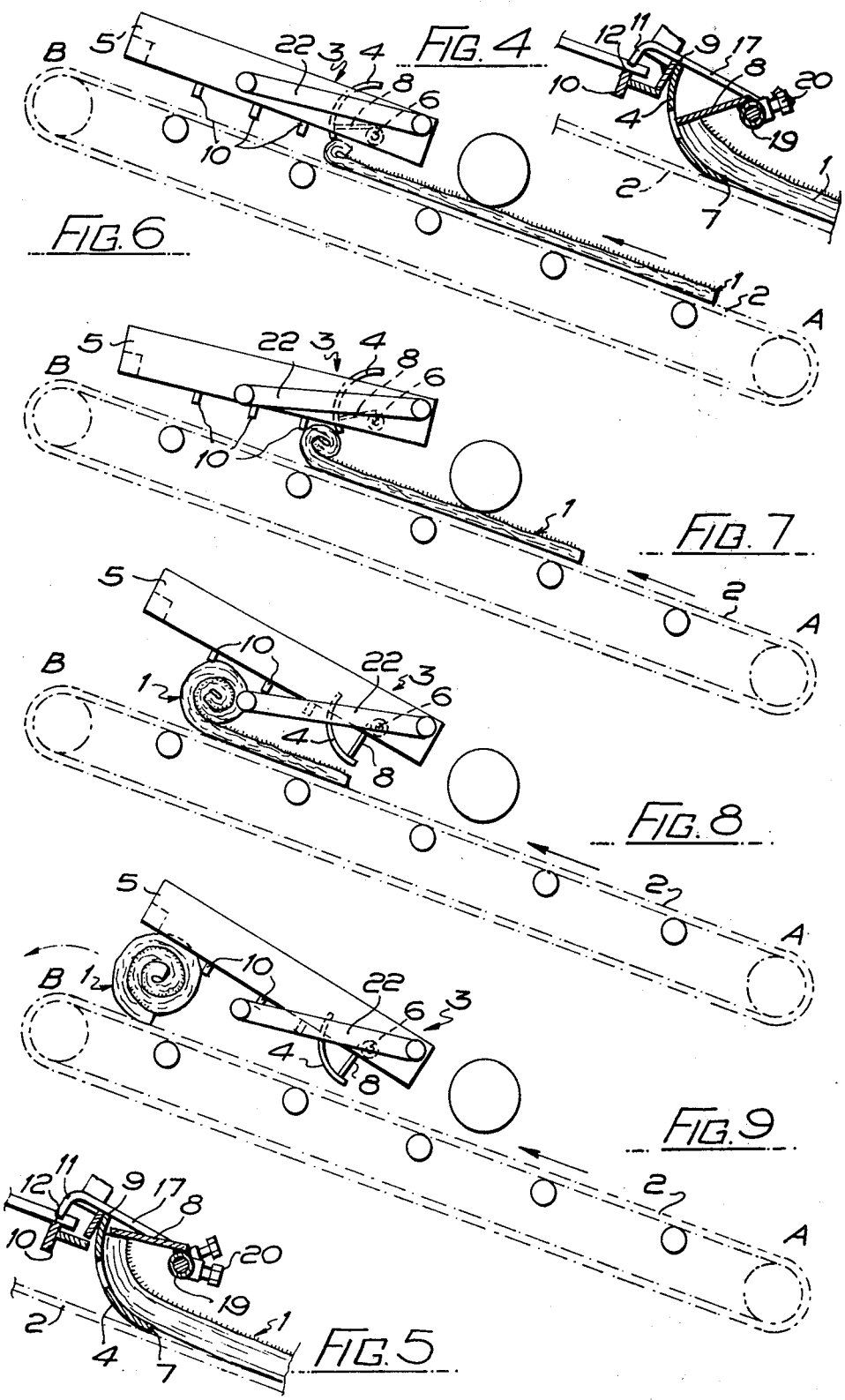

SOD ROLLING APPARATUS

This invention relates to apparatus for starting a turn in a strip of sod travelling along a conveyor and for causing the sod to roll up once the end of the strip has been turned.

It is known from U.S.A. Patent Specification No. 3,464,641 to provide a conveyor for a strip of sod with blocking means having a front portion slanting forwardly and upwardly, so that the leading end of the strip of sod strikes it, with a view to starting a turn in the strip, the blocking means being mounted for movement upwardly away from the conveyor when a sod whose leading end has been turned rolls up as it is carried by the conveyor between the conveyor and the rear portion of the blocking means, which rear portion has a plurality of cross-bars on its underside for engaging the sod to assist the rolling action.

However, with the known form of blocking means described above the condition of the sod is a fundamental factor governing whether or not the sod will turn and roll before the blocking means moves upwardly to let the sod pass beneath it. Not infrequently a sod is not turned at all by the front portion of the blocking means, and once the blocking means has moved upwardly to enable the unturned sod to move beneath it there is no possibility thereafter of rolling taking place.

The object of the invention is to provide apparatus for starting a turn in a strip of sod travelling along a conveyor and for causing the sod to roll up once the end of the strip has been turned, and which apparatus is effective on sods of any condition.

According to the present invention, there is provided apparatus for starting a turn in the leading end of a strip of sod travelling along a conveyor from a forward receiving position to a rearward discharging position and for causing the sod to roll up once the end of the strip has been turned, the apparatus comprising deflecting means having a forward part comprising a scoop extending transversely of the conveyor between liftable side members and having a uniform cross-section curving rearwardly and upwardly from the conveyor, the scoop being mounted to swing about a pivot axis extending between the side members above the forward edge of the scoop, the forward part also comprising a stop plate carried by the pivot axis of the scoop so as to be able to swing with the scoop and extending over a substantial length of the scoop, the stop plate being adjustable about the pivot axis so as to project towards the scoop anywhere between the forward and rearward edges of the scoop, and the deflecting means also having a rearward part comprising cross-bars on its underside between the side members.

The adjustment of the stop plate about the pivot axis enables it to be set to determine the extent to which the leading end of a strip of sod is deflected up into the scoop before the latter is swung upwardly about the pivot axis when the leading end of the sod pushes on the stop plate, the scoop and stop plate continue to swing upwardly until the turned up end formed thereby on the sod is able to fall back on to the conveyor, whereafter the turned up end is carried between the conveyor and the cross-bars of the rearward part of the deflecting means and the sod is rolled up by the time it leaves the rearward part of the deflecting means and proceeds to the discharging position of the conveyor.

The setting of the adjustable stop plate is dependent on the condition of the sods, i.e., the less moist the sod the higher the stop plate is set up the scoop to effect a greater turn by movement of the leading end of the sod up the scoop, before swinging of the scoop and stop plate allows the turned up end of the sod to fall on to the conveyor for rolling to be continued by the conveyor carrying the sod under the cross-bars.

The scoop is preferably provided with an abutment engaging a stop carried by the side members to determine the normal position of the scoop with its forward edge close to the conveyor, which is preferably tangential to the forward edge of the scoop, and the stop may be adjustable. The scoop is preferably also provided with a spring urging the scoop towards the position in which its abutment engages the stop, to assist gravity in returning the scoop to its normal position, and the spring is preferably provided with means for adjusting its loading so as to be able to vary the resistance to movement of the scoop effected by the leading end of a sod pushing against the stop plate. The stop carried by the side members may be the foremost cross-bar, and the spring may be a tension spring between a lever arm extending from the rearward edge of the scoop and one of the other cross-bars, and the lever arm is preferably provided with a series of holes for selective engagement by one end of the spring, to adjust the spring loading on the scoop.

The scoop is conveniently carried on a pivot bar rotatable in journals on the side members, with arms extending rigidly from the ends of the rearward edge of the scoop to collars secured to the pivot bar, and the stop plate extends rigidly from another pair of collars rotatable on the pivot bar and fixed thereto by set screws for setting the angular adjustment of the stop plate in the scoop.

The side members are conveniently provided with trunnions at their forward ends, with the trunnions rotatable in link arms extending forwardly from pivots mounted on side frames of the conveyor, whereby the deflecting means is enabled to lift as a whole to allow a sod with its leading end turned up to be carried by the conveyor under the rearward part of the deflecting means where the sod is rolled up between the conveyor and the cross-bars. Adjustable stop means are preferably provided between each link arm and the respective side frame of the conveyor, so that the scoop does not rest on the conveyor when the forward edge of the scoop is close to the conveyor.

A preferred embodiment of the invention will now be described, by way of example only, with reference to the accompanying drawings, in which:

FIG. 1 is a fragmentary perspective view showing apparatus in accordance with the invention mounted in relation to a sod conveyor;

FIG. 2 is a fragmentary section taken from the line 2—2 of FIG. 1, with a sod engaging the stop plate;

FIG. 3 corresponds to part of FIG. 2, but shows the position shortly afterwards;

FIGS. 4 and 5 also correspond to parts of FIG. 2, but show the stop plate in two different positions of initial adjustment in the scoop; and FIGS. 6 and 9 are diagrammatic elevations of the apparatus and the conveyor showing progressive stages in the rolling up of a sod, with FIG. 6 following on from FIG. 3.

In the drawings, apparatus for starting a turn in the leading end of a strip of sod 1 travelling along a conveyor 2 from a forward receiving position A to a rearward discharging position B and for causing the sod to roll up once the end of the strip has been turned comprises deflecting means 3 having a forward part comprising a scoop 4 extending transversely of the conveyor between liftable side members 5 and having a uniform cross-section curving rearwardly and upwardly from the conveyor, the scoop being mounted to swing about a pivot axis 6 extending between the side members above the forward edge 7 of the scoop, the forward part also comprising a stop plate 8 carried by the pivot axis of the scoop so as to be able to swing with the scoop and extending over substantially the whole length of the scoop, the stop plate being adjustable about the pivot axis so as to project towards the scoop anywhere between the forward edge 7 and the rearward edge 9 of the scoop, and the deflecting means also having a rearward part comprising crossbars 10 on its underside between the side members.

The adjustment of the stop plate 8 about the pivot axis 6 enables it to be set to determine the extent to which the leading end of a strip of sod is deflected up into the scoop 4 (compare FIGS. 2, 4 and 5) before the latter is swung upwardly about the pivot axis when the leading end of the sod pushes on the stop plate (see FIGS. 3 and 6), the scoop and stop plate continue to swing upwardly until the turned up end formed thereby on the sod is able to fall back on to the conveyor 2 (see FIG. 7), whereafter the turned up end is carried between the conveyor and the cross-bars 10 of the rearward part of the deflecting means 3 (see FIGS. 8 and 9) and the sod is rolled up by the time it leaves the rearward part of the deflecting means and proceeds to the discharging position B of the conveyor.

The setting of the adjustable stop plate 8 is dependent on the condition of the sods, i.e., the less moist the sod the higher the stop plate is set up the scoop 4 (compare FIGS. 2, 4 and 5) to effect a greater turn by movement of the leading end of the sod up the scoop, before swing of the scoop and stop plate allows the turned up end of the sod to fall on to the conveyor 2 for rolling to be continued by the conveyor carrying the sod under the cross-bars.

The scoop 4 is provided with abutments 11 engaging a stop 12 carried by the side members 5 to determine the normal position of the scoop with its forward edge 7 close to the conveyor 2 (see FIGS. 1 and 2), which is tangential to the forward edge of the scoop. The scoop is also provided with a spring 13 urging the scoop towards the position in which its abutment 11 engages the stop 12, to assist gravity in returning the scoop to its normal position, the stop being the top of the foremost cross-bar 10 and the spring 13 being a tension spring between a lever arm 14 extending from the rearward edge of the scoop and the rearmost cross-bar 10, and the lever arm being provided with a series of holes 15 for selective engagement by one end of the spring, to adjust the spring-loading of the scoop, so as to be able to vary the resistance to movement of the scoop effected by the leading end of a sod pushing against the stop plate.

The scoop 4 is carried on a pivot bar 6 rotatable in journals 16 on the side members 5, with arms 17 extending rigidly from the ends of the rearward edge 9 of the scoop to collars 18 secured to the pivot bar, and the stop plate 8 extends rigidly from another pair of collars 19 rotatable on the pivot bar and fixed thereto by set screws 20 for setting the angular adjustment of the stop plate in the scoop.

The side members 5 are provided with trunnions 21 at their forward ends, with the trunnions rotatable in link arms 22 extending forwardly from pivots 23, mounted on side frames 24 of the conveyor 2, whereby the deflecting means 3 is enabled to lift as a whole to allow a sod 1 with its leading end turned up to be carried by the conveyor under the rearward part of the deflecting means where the sod is rolled up between the conveyor and the cross-bars 10. Adjustable stop means 25 are provided between each link arm 22 and the respective side frame 24 of the conveyor 2, so that the scoop 4 does not rest on the conveyor when the forward edge 7 is close to the conveyor.

The forward receiving position A of the conveyor 2 may be disposed adjacent guide-means leading from a sod cutter in a machine (not shown) adapted to be attached to a tractor (not shown), e.g. as in U.S.A. Pat. No. 3,509,944. FIG. 1 shows a cross-frame 26 used in suspending the conveyor 2 alongside the tractor and also shows a chain 27 which takes the weight of the rearward part of the deflecting means 3.

What I claim is:

1. Apparatus for starting a turn in the leading end of a strip of sod travelling along a conveyor from a forward receiving position to a rearward discharging position and for causing the sod to roll up once the end of the strip has been turned, the apparatus comprising deflecting means having a forward part comprising a scoop extending transversely of the conveyor between liftable side members and having a uniform cross-section curving rearwardly and upwardly from the conveyor, the scoop being mounted to swing about a pivot axis extending between the side members above the forward edge of the scoop, the forward part also comprising a stop plate carried by the pivot axis of the scoop so as to be able to swing with the scoop and extending over a substantial length of the scoop, the stop plate being adjustable about the pivot axis so as to project towards the scoop anywhere between the forward and rearward edges of the scoop, and the deflecting means also having a rearward part comprising cross-bars on its underside between the side members.

2. Apparatus as in claim 1, wherein the scoop is provided with an abutment engaging a stop carried by the side members to determine the normal position of the scoop with its forward edge close to the conveyor.

3. Apparatus as in claim 2, wherein the conveyor is tangential to the forward edge of the scoop when the latter is in its normal position with its forward edge close to the conveyor.

4. Apparatus as in claim 2, wherein the stop is adjustable.

5. Apparatus as in claim 2, wherein the scoop is also provided with a spring urging the scoop towards the position in which its abutment engages the stop.

6. Apparatus as in claim 5, wherein the spring is provided with means for adjusting its loading.

7. Apparatus as in claim 6, wherein the stop carried by the side members is the foremost cross-bar, and the spring may be a tension spring between a lever arm extending from the rearward edge of the scoop and one of the other cross-bars.

8. Apparatus as in claim 7, wherein the arm is provided with a series of holes for selective engagement by one end of the spring.

9. Apparatus as in claim 1, wherein the scoop is carried on a pivot bar rotatable in journals on the side members, with arms extending rigidly from the ends of the rearward edge of the scoop to collars secured to the pivot bar, and the stop plate extends rigidly from another pair of collars rotatable on the pivot bar and fixed thereto by set screws for setting the angular adjustment of the stop plate in the scoop.

10. Apparatus as in claim 1, wherein the side members are provided with trunnions at their forward ends, with the trunnions rotatable in link arms extending forwardly from pivots mounted on side frames of the conveyor.

11. Apparatus as in claim 10, wherein adjustable stop means are provided between each link arm and the respective side frame of the conveyor.

* * * * *